Dec. 12, 1961 J. J. FORD, JR., ET AL 3,013,204
TESTING APPARATUS
Filed June 23, 1958
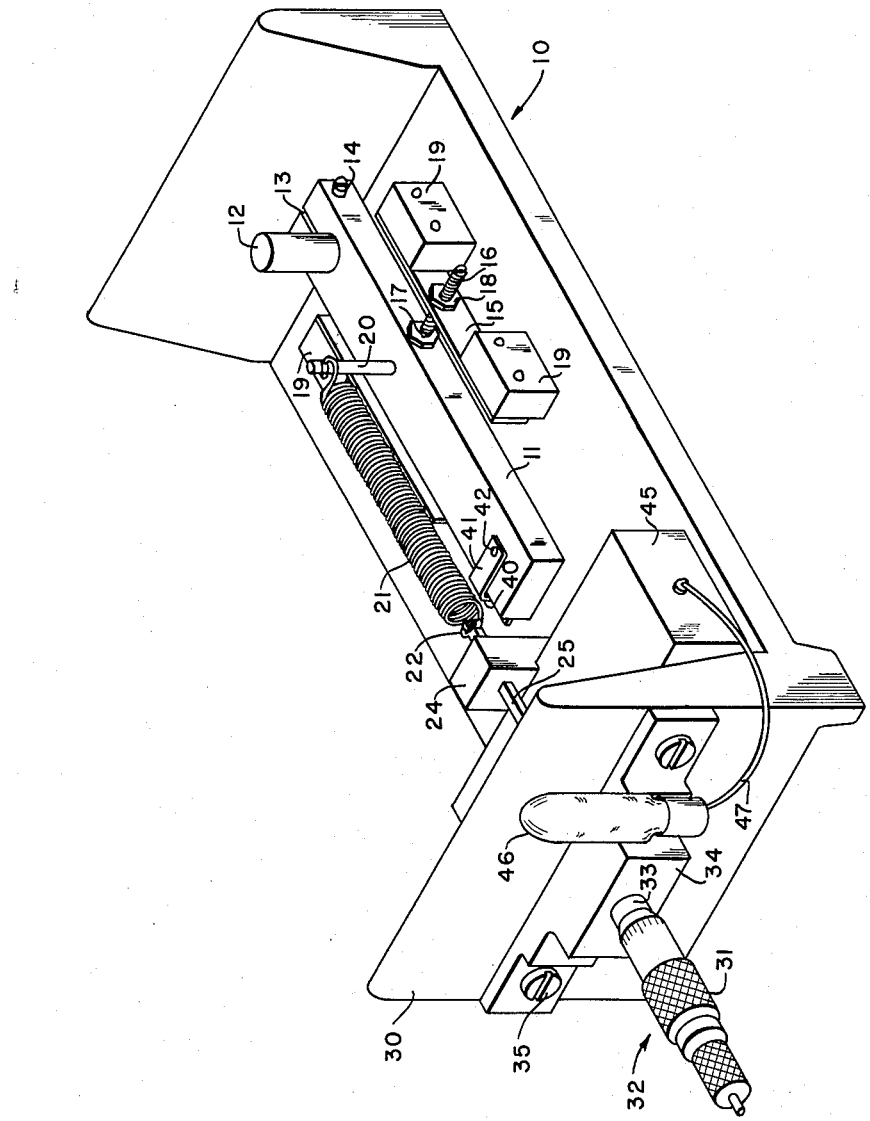
INVENTORS:
CHREST B. JOHNSON, JR.
JOHN J. FORD, JR
BY: James Todorovic
THEIR ATTORNEY 3,013,204
TESTING APPARATUS
John J. Ford, Jr., and Chrest B. Johnson, Jr., Houston, Tex., assignors to Shell Oil Company, a corporation of Delaware
Filed June 23, 1958, Ser. No. 743,870
1 Claim. (Cl. 324—34)

This invention pertains to detecting deterioration of non-magnetic tubing, and, in particular, the deterioration of non-magnetic stainless steel tubing used in the furnaces of chemical plants.

Furnaces used in many chemical plants utilize non-magnetic stainless steel tubing for the process tubing. In some chemical processes, for example, the preparation of ethylene, severe coking occurs on the surface of the tubing which is contacted by the ethylene. This severe coking causes premature failure of the tubes and results in costly shutdowns to replace the tube failures. The possibility of tube failures also results in unnecessary tube replacement in order to avoid the possibility of unexpected shutdown due to a tube failure. At the present, there is no accurate means available for predicting the useful life of these tubes nor is there a simple means for inspecting the tubes in place so as to detect tubes which are about to fail.

Accordingly, the principal object of this invention is to provide an indicator which will detect the location and approximate degree of deterioration or degradation of non-magnetic stainless steel tubing.

Another object of this invention is to provide a simple instrument which may be used to detect the location and approximate degree of degradation of non-magnetic stainless steel tubing while the tubing is in place in the furnace or other process equipment.

This invention results from the inspection of a large number of failed furnace tubes and the discovery that the point of failure of a furnace tube was strongly magnetic. The discovery of the magnetic character of the stainless tubing adjacent the point of failure gave rise to the possibility of detecting the deterioration of furnace tubing by locating the magnetic deposits and determining their magnitude. Accordingly, this invention utilizes a detector for locating the magnetic areas of the tubing combined with an accurate means for indicating the magnitude of the magnetic area.

This invention provides a device utilizing a permanent magnet which is disposed at one end of pivoted beam member. The beam member is spring biased in order to balance the beam when the magnet is positioned over a non-magnetic stainless steel tube free of any magnetic deposit. The presence of a ferrite or magnetic deposit in the tube caused by an excessive coke deposit will attract the magnet causing the beam to pivot in opposition to the biasing force. The movement of the beam is used to actuate a suitable indicating means so that the exact location of the ferrite deposit can be determined. By varying the force of the biasing means one can also determine the extent of penetration of the ferrite deposit since a deposit which has penetrated deeply will exert a greater attraction force on the magnet than one with slight penetration and, thus, require a greater biasing force to maintain the beam balance.

These and other objects and advantages of this invention will be more easily understood from the following detailed description of a preferred embodiment when taken in conjunction with the attached isometric drawing of a preferred embodiment.

Referring now to the drawing, 10 represents a base or supporting member which is formed of non-magnetic metal such as non-magnetic stainless steel, brass or aluminum. A beam member 11 which is also formed of non-magnetic material is pivotedly supported at its center by means of opposed bearing pins 16 having conical ends 17. The bearing pins thread into a support member 15 and are locked in place by means of jam nuts 18. Each of the support members 15 are secured at opposite ends to supports 19 which project upwardly from the base 10. A cylindrical permanent magnet 12 is secured to the left hand end of the beam by any desired means such as a slot 13 and a screw 14. The permanent magnet 12 may be formed of any desired magnetic material but is preferably formed of an aluminum, iron, cobalt, nickel alloy which is sold under the trade name of Alnico.

A post member 20 is secured to the beam in line with the axis of the two bearing pins 16 and is used as an attachment point for one end of the tension spring 21. The left end of the tension spring 21 is secured to the one end of the link 25 by any desired means such as by passing one end through a hole 22 formed in the right hand end of the link 25. The link 25 is disposed for sliding movement in the upper end of a support 24 which projects upwardly from the base member 10. The other end of the link passes through the end 30 of the base member and is connected to the end of the thimble 31 of micrometer 32 by any desired means (not shown). The frame 35 of the micrometer 32 is secured to a support 34 which in turn is secured to the end 30 of the base by screws 35. The use of the micrometer 32 provides an easy means for adjusting the tension of the spring 21 and measuring the force of the spring as will be more fully explained below. The tension of the spring 21 is adjusted so that the beam 11 is exactly balanced in order that right hand end will deflect downwardly when the magnet is passed over a ferrite deposit in a tube.

A contact support 40 is mounted on and insulated from the base member 10 adjacent the left hand end of the beam and is provided at the top with an offset portion 41 that projects over the top of the beam. The offset 41 carries one contact 42 of a switch means while the other contact of the switch is carried by the left hand end of the beam. The contact support 40 is connected to the positive side of the battery 45 by means of a lead (not shown) while the negative side of the battery is connected to a neon light 46 by a lead 47 with the light in turn being grounded to the base member 10 by means of a lead (not shown). Thus closing of the contacts will complete the circuit and cause the neon light 46 to ignite which will indicate a displacement of beam 11.

In order to use the above described detector to locate the position of a weak spot or magnetic penetration in a stainless steel tube the tension of the spring 21 is first adjusted so that the beam is exactly balanced. This can be accomplished by placing the detector over a non-magnetic surface and adjusting the tension of the spring 21 until the indicating light 46 is extinguished. The detector is then moved over the material to be checked until the magnet dips and the indicator light comes on which indicates a magnetic penetration. The position of greatest magnetic attraction is located by adjusting the tension on the spring until the indicator light goes off. In this position the amount of force tending to pull the magnet up is directly proportional to the amount the spring is stretched or $F=Kx$ where F is the force, K the spring constant and $x$ the amount the spring is stretched as measured by the micrometer. The force of attraction between a given magnet and a magnetic material may be stated mathematically as $$F' = \frac{K}{d^2}$$

where F' is the magnetic force of attraction, K is a constant whose value depends on the particular magnet used and the particular magnetic material under test and $d$ the distance between the magnet and the magnetic material. By properly calibrating the instrument to determine the constant K the thickness of the tube wall remaining between the magnetic penetration and the outer surface of the tube can be easily determined.

From the above description of this device and its operation it can be seen that this invention provides a simple means for checking tubes used in chemical process to determine their useful life. As explained above this invention results from the discovery, after inspecting many failed tubes, that the area was strongly magnetic surrounding the point of failure. Thus by determining the location of magnetic formations in tubes and the thickness of the tube remaining the useful life of the tube can be predicted. While there are other instruments available for locating magnetic materials none are capable of accurately measuring the thickness of the tube wall remaining. The use of the micrometer to adjust the spring tension provides a very accurate means for measuring spring elongation when the magnet is attracted by magnetic material. In addition the use of the indicator light and switch contacts provides a simple and accurate means for determining the exact position of the beam carrying the magnet, thus permitting accurate balancing of the beam.

While the above are important features of this invention other means could be used to perform these operations. Thus this invention should not be limited to the specific details of the above embodiment but only to its broad spirit and scope.

We claim as our invention:

A method for determining the useful life of stainless steel tubing subject to heating on one side comprising: inspecting the surface of the tube with a permanent magnet to locate magnetic formations in said tube; determining the force of attraction between said magnetic formation and said permanent magnet and determining the thickness of the tube remaining between said magnetic material and the surface of said tube based on said previously determined force of attraction.

References Cited in the file of this patent

UNITED STATES PATENTS

| | | |
|---|---|---|
| 2,685,216 | Bannister et al. | Aug. 3, 1954 |
| 2,749,505 | McNary | June 5, 1956 |
| 2,762,970 | Balduman | Sept. 11, 1956 |
| 2,843,821 | Gottlieb | July 15, 1958 |
| 2,867,784 | Shapiro | Jan. 6, 1959 |

FOREIGN PATENTS

| | | |
|---|---|---|
| 575,150 | Great Britain | Feb. 5, 1946 |